United States Patent
Zarpellon (10) Patent No.: US 10,247,351 B2
(45) Date of Patent: Apr. 2, 2019

(54) ORIENTABLE SUPPORT HEAD FOR VIDEO-PHOTOGRAPHIC APPARATUSES

(71) Applicant: LINO MANFROTTO + CO. S.p.A., Cassola (VI) (IT)

(72) Inventor: Stelvio Zarpellon, Bassano Del Grappa (IT)

(73) Assignee: VITEC IMAGING SOLUTIONS S.P.A., Cassola (VI) (IT)

( * ) Notice: Subject to any disclaimer, the term of this patent is extended or adjusted under 35 U.S.C. 154(b) by 0 days.

(21) Appl. No.: 15/571,824

(22) PCT Filed: May 4, 2016

(86) PCT No.: PCT/IB2016/052542
§ 371 (c)(1),
(2) Date: Nov. 4, 2017

(87) PCT Pub. No.: WO2016/178157
PCT Pub. Date: Nov. 10, 2016

(65) Prior Publication Data
US 2018/0347744 A1 Dec. 6, 2018

(30) Foreign Application Priority Data

May 4, 2015 (IT) .......................... 102015000013766

(51) Int. Cl.
*F16M 11/04* (2006.01)
*F16M 11/14* (2006.01)
(Continued)

(52) U.S. Cl.
CPC ........... *F16M 11/14* (2013.01); *F16M 11/041* (2013.01); *F16M 11/2014* (2013.01); *G03B 17/561* (2013.01); *F16M 2200/022* (2013.01)

(58) Field of Classification Search
CPC ...................................................... F16M 22/00
See application file for complete search history.

(56) References Cited

U.S. PATENT DOCUMENTS

| | | | |
|---|---|---|---|
| 2009/0136290 A1* | 5/2009 | Persson ............... | B60R 11/0252 403/125 |
| 2011/0147548 A1* | 6/2011 | Kang ..................... | F16M 11/14 248/181.2 |

(Continued)

FOREIGN PATENT DOCUMENTS

| | | |
|---|---|---|
| CH | 645529 A5 | 10/1984 |
| DE | 3000926 A1 | 9/1980 |

(Continued)

OTHER PUBLICATIONS

International Search Report and Written Opinion in PCT/IB2016/052542 dated Aug. 1, 2016.

*Primary Examiner* — Noam Reisner
(74) *Attorney, Agent, or Firm* — Kristina Castellano; Castellano PLLC (57) ABSTRACT

An orientable support head (1) for optical or video-photographic equipment comprises a first articulation element (2) and a second articulation element (3) which can be fixed to a support element and to the equipment, respectively, and which can be mutually moved, the first articulation element (2) comprises a member (10) which is internally hollow and which defines a receiving cavity (11) for the second articulation element (3), with a support element (15) for receiving in abutment the second articulation element (4) and an abutment element (14) for the second articulation element (4), locking means (20) which can be actuated in order to move the second articulation element (4) along a locking axis (X) between a release position (W), in which the second articulation element (4) is free to slide in the cavity (11), and a locking configuration (W'), in which the second articulation element (4) is urged against the abutment element (14) and is locked in the cavity (11), the locking means (20) further comprising a first guide element (34) and a second guide element (35) which are positioned in the member (10) and a pushing element (23) which is interposed therebetween along the locking axis (X) and which can be moved in translation with respect to those guide elements along an axis of translation (Y) which is transverse to the locking axis (X), the first guide element (34) being operatively interposed between the pushing element (23) and the support element (15), wherein there is provided a rolling member (31, 33) which is interposed between the pushing element (23) and the first guide element (34) and/or the second guide element (35), and the pushing element (23) is provided, on at least one base surface (S1, S2) which is directed towards the first guide element (34) or the second guide element (35), with at least one groove (30, 32) which cooperates with another groove (36, 37) which is defined in the first guide element (34) or the second guide element (35) in order to form a pair of guides (50) for the sliding receiving of the rolling member (Continued)

(31, 33), in which the base portion (30', 32', 36', 37') of at least one groove (30, 32, 36, 37) is inclined with respect to the locking axis (X) in such a manner that, following the translation movement of the pushing element (23), there is generated a movement of the second articulation element (4) along the locking axis (X).

17 Claims, 3 Drawing Sheets (51) Int. Cl.
  *F16M 11/20* (2006.01)
  *G03B 17/56* (2006.01)

(56) References Cited

U.S. PATENT DOCUMENTS

| | | | |
|---|---|---|---|
| 2012/0237196 A1* | 9/2012 | Li | F16M 11/14 |
| | | | 396/428 |
| 2015/0001365 A1* | 1/2015 | Vogt | F16M 11/10 |
| | | | 248/371 |

FOREIGN PATENT DOCUMENTS

| | | |
|---|---|---|
| FR | 2679968 A1 | 2/1993 |
| WO | 2010108821 A1 | 9/2010 |

\* cited by examiner

ORIENTABLE SUPPORT HEAD FOR VIDEO-PHOTOGRAPHIC APPARATUSES

CROSS REFERENCE TO RELATED APPLICATIONS

This application is a U.S. National Stage Application of International Patent application PCT/IB2016/052542 filed on May 4, 2016, which claims priority to Italian patent application 102015000013766 filed on May 4, 2015, the contents of both of which are incorporated herein by reference.

TECHNICAL FIELD

The present invention relates to an orientable support head for optical or video-photographic equipment having the features set out in the preamble of the main claim.

TECHNOLOGICAL BACKGROUND

Orientable support heads of the type indicated are typically used in connection with stands, tripods or other supports which are known in the technical sector being referred to in order to support optical or video-photographic equipment in one or more preselected spatial orientations.

Those heads are typically provided with one or more articulation joints, for example, of the spherical or cylindrical type, in order to vary the positioning of the equipment supported by the head with respect to the support to which the head is fixed.

Generally, the conventional support heads are provided with a locking device which can be actuated selectively in order to lock the articulation in a desired configuration and in order to release the articulation in order to allow the positioning of the equipment in a new configuration, respectively.

WO2013/117538 describes a support head comprising a cylindrical member which is provided with an internal cavity to rotatably receive a ball and a locking device which can be actuated in order to clamp the ball against the cylindrical member.

The ball is supported on a sliding ring which is in turn supported on a pressure ring.

The locking device is actuated by means of a handle which is arranged externally with respect to the cylindrical member and comprises a threaded shaft, on which there are positioned two threaded blocks which are provided with an inclined surface which is directed towards the ball and which is intended to abut an additional inclined surface of the pressure ring. By the threaded shaft being rotated by means of the handle, the threaded blocks are moved relative to each other on the shaft itself, and the inclined surfaces thereof slide against the inclined surface of the pressure ring so as to lift it by clamping the ball between the pressure ring and an abutment ring or, vice versa, so as to allow a lowering of the pressure ring by making the ball free to rotate in the cavity.

A drawback of that locking system is that it is not very durable because the sliding surfaces become worn over time.

That drawback is particularly evident in the case of heads having substantial dimensions and weight.

Another drawback of that locking system is that it has a low level of efficiency as a result of the losses owing to sliding friction between the rubbing components during the locking/unlocking.

The losses owing to friction increase the rotation which has to be imposed on the handle in order to obtain the locking/unlocking and the force required by the user in order to actuate the locking system.

STATEMENT OF INVENTION

The problem addressed by the present invention is to provide an orientable support head for optical or video-photographic equipment which is structurally and functionally configured to overcome the drawbacks set out above with reference to the cited prior art.

In particular, an object of the invention is to provide a support head with a locking system which is particularly efficient and formed so as to be able to be readily actuated following the application of a minimum force by the user.

This problem is solved by the present invention by means of an orientable support head constructed in accordance with the appended claims.

BRIEF DESCRIPTION OF THE DRAWINGS

The features and advantages of the invention will be better appreciated from the detailed description of some preferred embodiments thereof, illustrated by way of non-limiting example with reference to the appended drawings, in which.

PREFERRED EMBODIMENT OF THE INVENTION

The Figures show an orientable support head 1 for optical or video-photographic equipment constructed according to the present invention.

The head 1 is constructed in order to support video-photographic equipment and to orientate that equipment with respect to a generic stand, such as a tripod or the like, the function of which is to provide a solid support on the ground. Both the above-mentioned pieces of equipment and the stand are conventional per se and therefore are not illustrated in the appended Figures.

The head 1 comprises a first articulation element 2 and a second articulation element 3 which are connected to each other so as to allow the orientation of the video-photographic equipment with respect to the stand in a desired position selected by the operator.

In the preferred form of the invention described here, the connection between the first articulation element 2 and the second articulation element 3 is of the ball type.

The first articulation element 2 comprises a base 7 which is provided with attachment means 8, to which the stand can be fixed and to which there is fixed a shell-like member 10 which is capable of rotation about a vertical axis X.

The second articulation element 3 comprises a spherical ball 4, from which there radially extends a rod 5, to the end of which opposite the spherical ball 4 there is fixed a plate 6 which is provided with additional attachment means 9 for removably fixing the video-photographic equipment.

The attachment means 8 and the additional attachment means 9 are known in the sector and will not be described in detail.

The shell-like member 10 is internally hollow and formed so as to define a receiving cavity 11, in which the spherical ball 4 is received and retained in engagement.

The receiving cavity 11 is provided, at the opposite side to the base 7, with an opening 12, through which the tang 5 of the ball 4 extends and which limits, by means of interference, the possibility of orientation of the second articulation element 3 with respect to the first articulation element 2.

The profile of the opening 12 further has a recess 13 which extends towards the base 7 so as to allow the movement of the rod 5 in a substantially perpendicular configuration with respect to the axis of the base 7, generally used to carry the equipment in a so-called "portrait" configuration (not illustrated in the appended Figures).

The internal edge of the opening 12, that is to say, the edge directed towards the receiving cavity 11, is capable of constituting the abutment surface 114 for the ball 4 and is formed so as to receive in abutment the ball 4 in order to lock it in the receiving cavity 11.

In the version shown, there is further provided an abutment ring 14 which is interposed between the abutment surface 114 and the ball 4 and which is intended to be clamped therebetween during use in order to lock the ball 4 in the receiving cavity 11, as will be better explained below.

In a version which is not shown, the abutment ring may not be provided, the ball 4 being clamped against the abutment surface 114 of the shell-like member 10.

There is provided inside the shell-like member 10 a support element 15 for the ball 4 which is provided with a support wall 15A which is intended to receive in abutment the ball 4 and which is shaped so as to be connected with form-fitting thereto.

The support element 15 is formed, in the version shown, in the manner of a ring from plastics material in order to ensure good sliding of the ball during the positioning and to limit the wear of the components during the positioning.

The receiving cavity 11 of the ball 4 is therefore delimited by an internal side wall 16 of the shell-like member 10, by the support wall 15A of the support element 15 and by the abutment ring 14.

The head 1 further comprises a locking device 20 which is mounted on the shell-like member 10 and which is partially received inside the shell-like member 10, and which can be actuated in order to lock the first and second articulation elements 2, 3 in a desired relative configuration or in order to unlock them and to allow them to move, as described in detail below.

Figure 1:
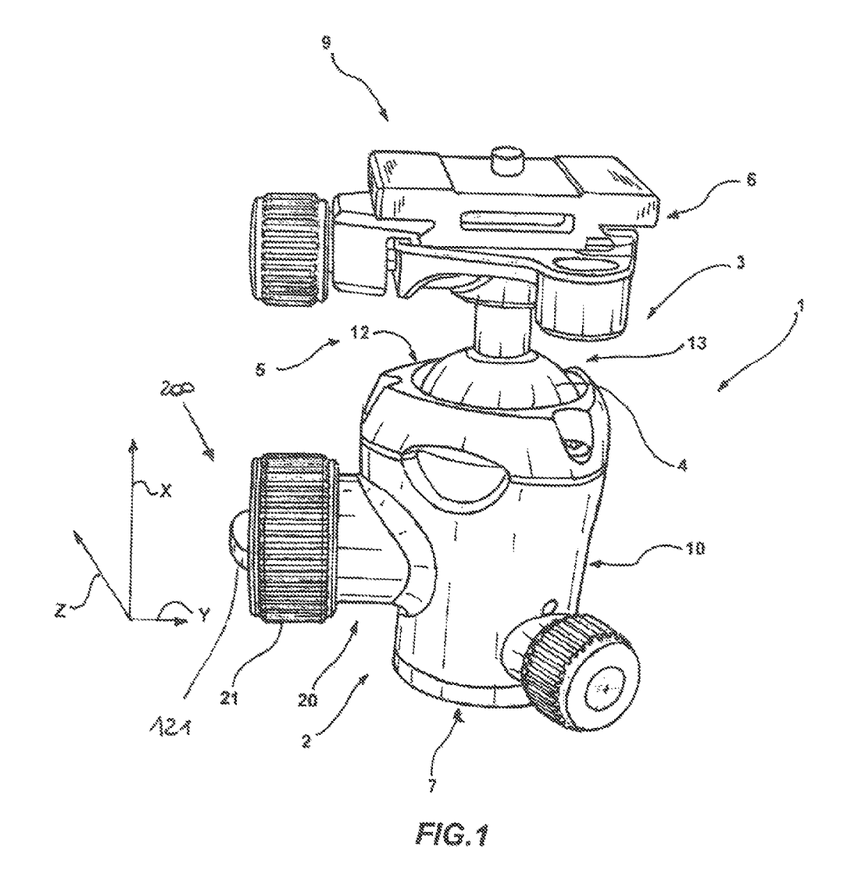
FIG. 1 is a perspective view of an orientable support head for optical or video-photographic equipment constructed according to the present invention.
Figure 2:
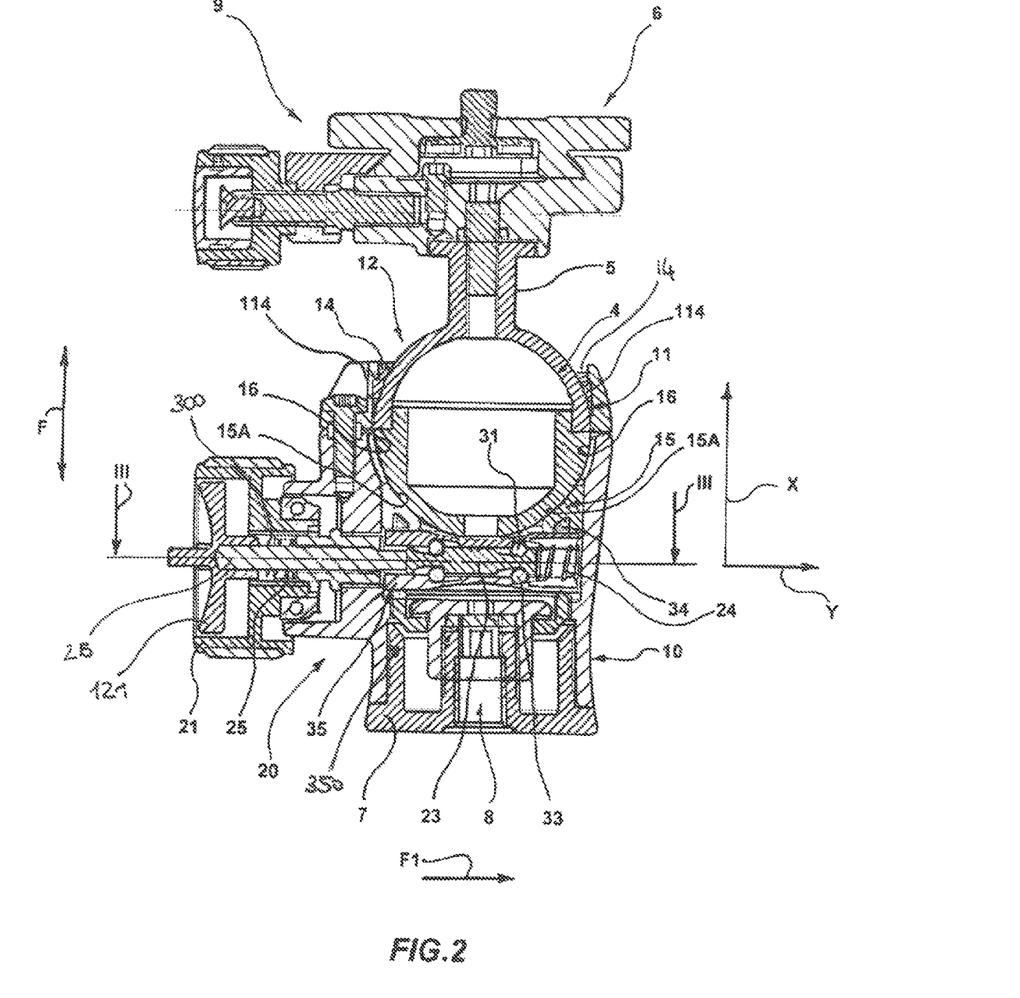
FIG. 2 is a laterally sectioned view of the head of FIG. 1.
Figure 3:
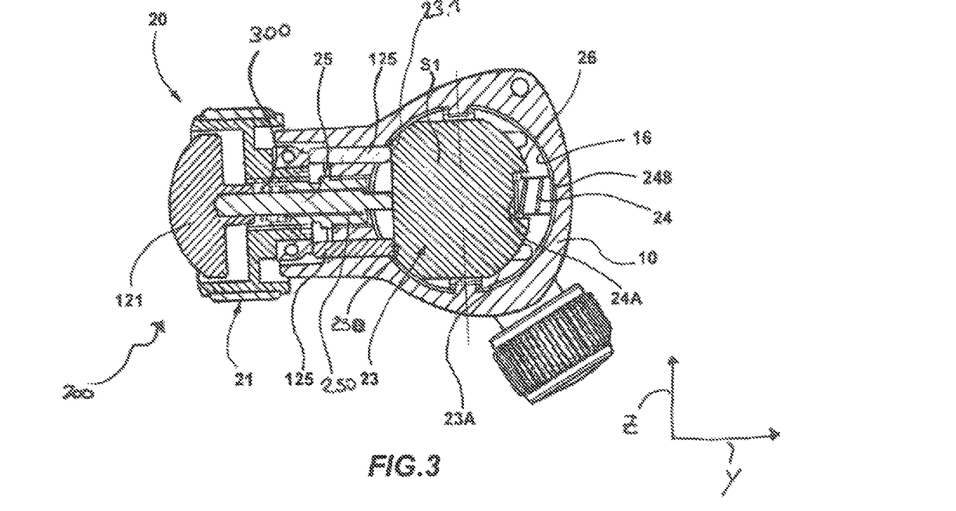
FIG. 3 is a laterally sectioned view of the head of FIG. 2 taken in the plane III-III.
Figures 4, 5:
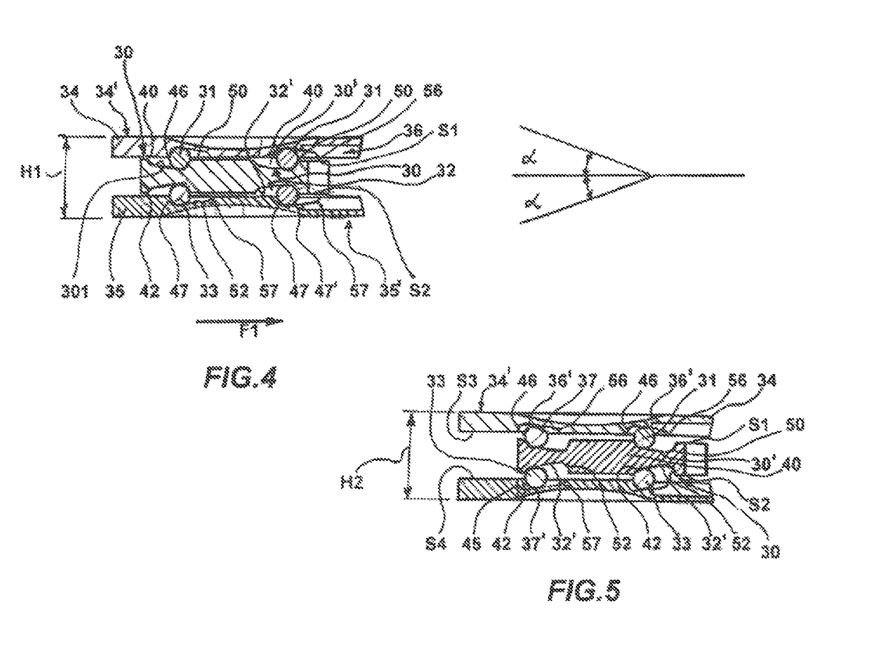
FIGS. 4 and 5 are views, drawn to an enlarged scale, of a detail of FIG. 2 in two different operating configurations.

The locking device 20 comprises an actuation handle 21 which is positioned on the shell-like member 10 and which can be controlled so as to rotate in order to actuate the locking device so as to move the ball 4 along a locking axis which, in the Figures shown, corresponds to the vertical axis X, between a release configuration W which is shown in FIGS. 1-4 and a locking configuration W' which is only shown partially in FIG. 5.

The actuation handle 21 is intended to be rotated about a transverse axis Y which is perpendicular to the locking axis X in order to actuate/unlock the locking device 20. In the release configuration W, the spherical ball 4 is slidingly supported on the support wall 15A and the abutment surface 114, with the capacity for rotation in the receiving cavity 11, while in the locking configuration W' the spherical ball 4 is clamped between the abutment ring 14 or, if the ring is not present, between the abutment surface 114 and the support element 15 and is locked in a desired position in the receiving cavity 11.

The locking device 20 comprises a pushing element 23 which is received in the shell-like member 10 and which can slide inside the member 10 along a translation axis Y and two cylindrical pins 125 which are operatively interposed between the handle 21 and the pushing element 23 in order to transmit the movement from the actuation handle 21 to the pushing element 23 during the locking and unlocking operations of the ball 4.

The two cylindrical pins 125 are spaced apart from each other in the direction of a longitudinal axis Z which is perpendicular to the translation axis Y and the locking axis X and are positioned so as to abut the pushing element 23 in two different peripheral portions 230, 231 which are longitudinally opposite. This allows optimization of the movement of the pushing element 23 as a result of the effect of the cylindrical pins 125.

The locking device 20 further comprises a friction device 200 which can be actuated independently of the locking device 20 and which is intended to act with friction on the sliding action of the ball 4 in the receiving cavity 11 so as to adjust the friction applied to the ball 4 itself, as will be better explained below.

The friction device 200 comprises a handle 121 and a screw 25 which is operatively interposed between the handle 121 and the pushing element 23 in order to transmit the movement from the handle 121 to the pushing element 23.

The screw 25 of the friction device 200 is interposed between the two cylindrical pins 125 in the direction of a longitudinal axis Z which is perpendicular to the translation axis Y and the locking axis X.

That arrangement allows a reduction in the spatial requirement of the locking device 20 and the friction device 200 in the head of the invention.

That arrangement further allows the actuation handle 21 and the handle 121 to be arranged coaxially.

The friction device 200 further comprises a nut screw 250, in which there is received the screw 25 and a thrust spring 300 which is interposed between the nut screw 250 and the handle 121 which is intended to apply a thrusting force between the nut screw 250 and the handle 121 which is parallel with the translation axis Y.

The thrust spring 300 is pretensioned so as to urge the nut screw 250 and the handle 121 away from each other in order to act with friction on the rotation of the handle 121 about the translation axis Y.

The handle 121 is rotatable inside the actuation handle 21 with respect thereto and is intended to be rotated about the transverse translation axis Y which is perpendicular to the locking axis X in order to actuate the friction device 200 in order to adjust the friction applied to the ball 4, as will be better explained below.

That position makes the actuation by the operator of the locking device 20 and the friction device 200 particularly simple.

The screw 25 is fixedly joined to the handle 121 and is translated along the translation axis Y following a rotation thereof, while the two cylindrical pins 125 are fixedly joined to the actuation handle 21 and are moved in translation along the translation axis Y following a rotation of the actuation handle 21.

By the friction device 200 being actuated, it is possible to move the pushing element 23 along the translation axis Y in order to apply a desired pressure to the ball 4 so as to prevent unexpected and undesirable movements thereof, as will be better explained below. This allows the actuation and the locking/unlocking of the ball 4 to be improved and made more precise.

The locking device 20 further comprises a first guide element 34 and a second guide element 35 which are fixed with respect to the translation axis Y and which are positioned inside the shell-like member 10 so that the pushing element 23 is interposed therebetween along the locking axis X.

The first guide element 34 is operatively interposed between the pushing element 23 and the support ring 15 and can be moved in translation along the locking axis X in order to interact with the support ring 15 in order to lock/unlock the ball 4, as will be better explained below.

The second guide element 35 is interposed between the pushing element 23 and the base 7 and is fixed with respect to the member 10.

Advantageously, the position of the second guide element 35 with respect to the locking axis X can be adjusted by means of a suitable adjustment device which, in the version shown, comprises a threaded ferrule 350. By acting on the threaded ferrule 350, it is possible to fix the position of the second guide element 35 along the locking axis X and consequently to vary the position of the ball 4 in the release configuration W, that is to say, the pressure applied to the ball 4 in the release configuration W and in the locking configuration W'.

The pushing element is, in the version shown, a plate 23 which is delimited by lateral edges 23A and by two opposing base surfaces S1, S2 which are directed towards the first guide element 34 and the second guide element 35, respectively.

The plate 23 can be moved in translation along the translation axis Y with respect to the first guide element 34 and the second guide element 35, respectively, between a first position and a second position which correspond to the release configuration W and the locking configuration W' of the locking device 20, respectively.

Along the translation axis Y, the plate 23 is operatively interposed between the cylindrical pins 125 and the screw 25 at one side and an abutment spring 24 at the opposite side, the cylindrical pins 125 and the screw 25 are connected to the plate 23 in mutually opposing positions along the translation axis Y in relation to the spring 24.

A first end 24A of the spring 24 is received in a recess 26 which is provided in an edge 23A of the plate 23 and the second end 24B is in abutment with the side wall 16, the spring 24 is precompressed so as to apply an urging force to the plate 23 so as to move the locking device 20 into the release configuration W, that is to say, the plate 23 in the first position.

The first and the second base surfaces S1, S2 of the plate 23 are provided with at least a first groove 30 and at least a second groove 32, respectively, which extend along a longitudinal axis Z which is perpendicular to the translation axis Y and the locking axis X which are intended to receive at least a first and a second rolling member in a sliding manner, respectively.

In a version which is not shown, the grooves can extend along an axis which is transverse to the translation axis Y and perpendicular to the locking axis X.

In the version shown, the first and the second base surfaces S1, S2 are provided with two first grooves 30 and two second grooves 32, respectively, for receiving two first rolling cylinders 31 and two second rolling cylinders 33 which, during the translation movement of the plate 23 along the translation axis Y, roll in the grooves 30, 32, respectively.

The two first grooves 30 and the two second grooves 32 are mutually spaced apart along the translation axis Y by a distance which is selected on the basis of the dimensions of the head 1, respectively. The first guide element 34 is provided with a thrust surface 34' which is directed towards the ball 4 and which is intended to interact with the ring 15, and an opposing sliding face S3 which is directed towards the plate 23. The second guide element 35 is provided with a base face 35' which is supported on the base 7 and an opposite sliding face S4 which faces is directed towards the plate 23.

In a version of the head which is not shown, the first guide element 34 and the support element 15 are formed in a single piece, that is to say, the first guide element 34 also acts as the support element for the ball 4.

In that case, the thrust surface 34' of the first guide element which is directed towards the ball 4 is intended to interact directly with the ball 4 in order to clamp it in the cavity 11 and/or to allow it to slide therein.

Advantageously, in that version, the thrust surface 34' of the first guide element 34 is formed so as to be connected with form-fitting to the ball 4.

The sliding faces S3, S4 of the first guide element 34 and the second guide element 35 are provided with additional first grooves 36 and additional second grooves 37 which are intended to cooperate with the corresponding first and second grooves 30, 32 in order to receive in a sliding manner first and second rolling cylinders 31, 33, respectively.

The first grooves 30 and the additional first grooves 36 and the second grooves 32 and the additional second grooves 37 are arranged in a mutually facing position and form guide pairs 50 for the rolling action of the first and second rolling cylinders 31, 33.

The provision of the guide pairs 50 allows the mutual sliding to be made easier between the plate 23 and the first guide element 34 and second guide element 35, that is to say, the actuation of the locking device 20, and allows the operation thereof to be made more precise.

Furthermore, the provision of the guide pairs 50 and the rolling members causes the production of rolling friction and not sliding friction during the operation of the locking device 20.

Therefore, the losses of efficiency owing to friction and the force necessary for the operation of the locking device of the invention are reduced.

This involves the locking device 20 of the invention having a high level of operating efficiency and having a high level of durability over time, and that efficiency being maintained over time.

Furthermore, the provision of the guide pairs 50 allows the integrity of the rolling members to be preserved and the positioning to be kept stable.

As can better be seen in FIGS. 4 and 5, each groove 30, 32, 36, 37 is provided with a respective base portion 30', 32', 36', 37' with a cylindrical concave profile which is formed so as to receive the rolling members 31, 33 and is delimited by a proximal edge 40, 42, 46, 47 which is directed towards the actuation handle 21 and an opposite distal edge 50, 52, 56, 57, which are spaced apart from the translation axis Y and which define the stopping elements for the rolling of the rolling members 31, 33 during the translation movement of the plate 23, as will be better explained below.

The base portion 30', 32', 36', 37' of each groove 30, 32, 36, 37 is inclined about the movement axis Y with respect to the locking axis X through an angle α which is preferably between 5° and 30° so that, by moving the plate 23 along the movement axis Y, the overall spatial requirement of the locking device 20 is varied along the locking axis X, as will be better explained below.

The base portions 30', 32', 36', 37' of the grooves of each guide pair 50 have inclinations which are mutually in accordance and, in the version shown, are parallel with each other.

The base portions 30', 32' of the grooves 30, 32 which are defined on a base surface S1, S2 of the plate 23 have inclinations which are mutually in accordance and which are counter to the inclination of the base portions 32', 30' of the grooves 32, 30 of the opposite base surface S2, S1.

The grooves of each guide pair 50 are arranged in such a manner that, in the release configuration W and locking configuration W', the rolling cylinders 31, 33 are clamped between two different opposing edges of the grooves 30, 32, 36, 37.

In particular, as shown in FIG. 4, in the release configuration W, the first and second rolling cylinders 31, 33 are clamped between the proximal edges 46, 47 of the additional first grooves 36 and additional second grooves 37 and the distal edges 50, 52 of the first and second grooves 30, 32, respectively. In that position, the base face 35' and the thrust surface 34' are positioned at a distance H1 which is considered in the locking axis X to be between 5 and 20 mm.

By rotating the actuation handle 21 about the translation axis Y, a movement of the cylindrical pins 125 along the translation axis Y is brought about and they apply an urging force to the plate 23, causing a movement of the plate 23 itself along the translation axis Y in the direction indicated by the arrow F1 in FIG. 4. The plate 23 is therefore urged towards the side wall 16 of the shell-like member 10 and is caused to move in translation with respect to the first guide element 34 and second guide element 35.

That translation movement brings about a movement along the translation axis Y of the first and second grooves 30, 32 relative to the additional first grooves 36 and additional second grooves 37, respectively, and a consequent rolling of the rolling cylinders 31, 33 on the base portions 30', 32', 36', 37' of the grooves themselves.

In particular, as shown in FIG. 5, in the locking configuration W', the first and second rolling cylinders 31, 33 are clamped between the proximal edges 40, 42 of the first and second grooves 30, 32 and the distal edges 56, 57 of the additional first and second grooves.

In that position, the base face 35' and the thrust surface 34' are positioned at an additional distance H2 which is considered in the locking axis X to be greater than the distance H1 as a result of the resilience of the materials of the components which are subjected to the locking force.

Since, as mentioned, the base portions of the grooves of each guide pair 50 are inclined with respect to the locking axis X, following the translation movement of the plate 23 there is also produced a movement of the rolling cylinders 31, 33 along the locking axis X in addition to along the translation axis Y.

From the release configuration W to the locking configuration W', the first rolling cylinders 31 are moved in translation away from the ball 4 and the second rolling cylinders 33 are moved in translation away from the base 7.

Since the second guide element 35 is fixed, that movement causes a translation movement of the plate 23 and the first guide element 34 along the locking axis X towards the ball 4.

Consequently, the first guide element 34 applies a thrusting force to the ring 15, or directly to the ball 4, so as to clamp and lock the articulation at the inner side of the cavity 11.

Since, as mentioned, the base portions of the grooves of each guide pair 50 are inclined with respect to the locking axis X, the progressive translation movement of the plate 23 along the translation axis Y in the direction of the arrow F1 causes a progressive increase in the pressure applied to the ball 4, that is to say, the locking force acting on the ball 4 itself.

The translation in the opposite direction of the plate 23 under the thrusting force of the spring 24 causes a rolling action of the rolling cylinders 31, 33 in the respective grooves and a translation movement thereof towards the ball 4 and the base 7.

Since the second guide element 35 is fixed, that movement causes a translation movement of the plate 23 and the first guide element 34 along the locking axis X away from the ball 4.

The first guide element 34 does not apply any thrusting force to the ball 4, or applies to the ball 4 a limited force which can be overcome by an operator in order to be able to orientate the ball 4 in the receiving cavity 11.

In that case, as a result of the inclination of the base portions of the grooves of each guide pair 50, evidently the pressure applied to the ball 4 also decreases progressively in accordance with the movement of the plate 23 along the translation axis Y. Therefore, a sudden and unexpected unlocking of the ball 4 inside the receiving cavity 11 is not brought about.

Furthermore, the presence of the friction device 200 which can be actuated independently of the locking device 20 allows control and variation of the pressure applied to the ball 4 in the release configuration W of the locking device 20 so as to prevent abrupt falls or undesirable movements thereof.

By rotating the handle 121 about the translation axis Y, the screwing of the screw in the corresponding nut screw 250 is varied, thereby causing a movement of the screw 25 itself along the translation axis Y.

By rotating the handle 121 so as to move the screw 25 against the plate 23, that is to say, in the direction indicated by the arrow F1 in FIG. 4, the urging force applied by the screw 25 to the plate 23 is progressively increased. The plate 23 is therefore urged along the translation axis Y in the direction indicated by the arrow F1, that is to say, towards the side wall 16 of the shell-like member 10. The plate 23 is therefore caused to move in translation with respect to the first guide element 34 and second guide element 35.

Similarly to what has been discussed above, that translation movement of the plate 23 brings about a movement along the translation axis Y of the first and second grooves 30, 32 relative to the additional first and second grooves 36, 37, respectively, and a consequent rolling of the rolling cylinders 31, 33 on the base portions 30', 32', 36', 37' of the grooves themselves.

The rolling cylinders 31, 33 are moved by the proximal edges 40, 42, 46, 47 of each groove and therefore, similarly to what has been discussed above, the distance between the base face 35' and the thrust surface 34' is increased, and therefore the pressure applied to the ball 4.

By suitably rotating the handle 121, it is therefore possible to adjust the pressure applied to the ball 4 in the release configuration of the locking device 20.

By acting on the handle 121, there is thereby adjusted the position of the rolling members in the respective grooves in the release configuration W of the locking device 20.

Therefore, the friction device 200 controls the force which has to be applied to the ball 4 with the locking device 20 in the release configuration W in order to move the ball 4 from a desired position in the receiving cavity 11.

That force can be controlled as a function of the characteristics and the weight of the equipment which is fixed to the head.

This prevents, after the locking device 20 has been unlocked, the equipment from falling or moving unexpectedly from the desired position.

When the locking device 20 is in the release configuration W, the screw 25 is in contact with and urged against the plate 23 in order to urge it into a desired position along the translation axis Y so as to apply a desired pressure to the ball 4.

In order to lock the locking device 20, the operator rotates the actuation handle 21, moving the pins 125 which further urge the plate 23 towards the internal side wall 16 of the shell-like member 10. The urging force of the cylindrical pins 125 causes a translation movement of the plate 23 with consequent detachment thereof from the screw 25.

In that configuration, the thrust spring 300 acting on the nut screw 250 allows accidental detachment actions of the handle 121 to be prevented.

When the locking device 20 is moved back into the release configuration W, the plate 23, as a result of the action of the spring 24, is urged along the translation axis against the screw 25 which acts as an abutment element for the plate 23, thereby preventing an additional translation movement of the plate 23 away from the internal wall 16.

The position of the screw 25 which is controlled by acting on the handle 121 determines the position which can be reached by the plate 23 in the release configuration W and therefore the pressure applied to the ball 4 in that configuration.

It is further possible to produce in the head of the invention an additional control of the pressure which is applied to the ball 4 in the release configuration W and locking configuration W' of the locking device 20, by controlling the position of the second guide element 35 along the locking axis 35 by acting on the locking ferrule 350.

By acting on the friction device 200 and/or on the locking ferrule 350, it is possible to control and vary the force applied to the ball 4 and also to control the position of the rolling members 31, 33 in the respective grooves 30, 32 and to limit the extent of the travel available to the rolling members 31, 33 in the grooves 30, 32 themselves.

In particular, the position of the rolling members 31, 33 can be controlled in one of the manners described above so that, in the release configuration W, the rolling members 31, 33 are not in abutment against the proximal edge 46, 47 of the additional first grooves 36 and additional second grooves 37 and the distal edge 50, 52 of the first and second grooves 30, 32 and/or so that, in the locking configuration W', the rolling cylinders 31, 33 are not clamped between the proximal edge 40, 42 of the first and second grooves 30, 32 and the distal edge 56, 57 of the additional first and second grooves.

This allows control of the friction applied to the ball 4 when the locking device 20 is in a release configuration W, or the force which it is necessary to apply to move the ball 4 from the position thereof and also the locking position W'.

In the event of use of the head with equipment which is particularly heavy, it is, for example, possible to increase the friction applied in such a manner that it is possible to prevent falls or undesirable movements thereof following the unlocking of the unlocking device 20.

In versions of the head which are not shown, only the grooves of one of the base surfaces S1, S2 of the plate 23 or only the grooves 30, 32 of the plate 23 or only the grooves of the first and/or second guide element 34, 35 have base portions which are inclined with respect to the locking axis X so that, by moving the plate 23 in translation along the translation axis Y, a movement of the first guide element 34 along the locking axis X is brought about.

The provision of inclined base portions on both the grooves of each guide pair 50 allows a further increase in the efficiency of the locking device 20 and allows a greater movement of the articulation 4 to be obtained for the same translation path of the plate 23.

That version is therefore particularly suitable for heads having small dimensions.

By varying the value of the inclination angle $\alpha$ of the base portions 30', 32', 36', 37' of the grooves 30, 32, 36, 37, the travel of the plate 23 necessary for obtaining a specific movement of the articulation 4 along the locking axis X is varied.

That value is therefore selected on the basis of requirements involving efficiency and rapidity of the locking device.

In other versions which are not shown, the plate 23 may be provided with one or more grooves only at a base surface, that is to say, the rolling members can be interposed between the plate and the first and second guide elements.

In versions of the head which are not shown, the plate and consequently the first and second guide elements can be provided at each base surface with a single groove which is intended to receive one or more rolling members.

In other versions which are not shown, the plate is provided at each base surface with three or more grooves which are each intended to receive in a sliding manner at least one respective rolling member.

The number, the position and the distance of the grooves at each base surface of the plate are selected on the basis of the dimensions and/or requirements involving mechanical strength of the head.

In other versions which are not shown, there may be provided rolling members which are different from cylinders, for example, balls. In that case, one or more balls may be introduced in each groove.

There may be defined in each groove a plurality of groove portions which are each intended for receiving a rolling member, in particular a cylinder or a ball.

The rolling members are preferably produced from steel.

The provision of rolling cylinders 31, 33 which extend along the longitudinal axis Z or a plurality of rolling members which are side by side along the longitudinal axis Z further allows an improvement of the movement between the release configuration W and the locking configuration preventing irregular movements of the various portions of the head.

The invention claimed is:

1. An orientable support head for video-photographic equipment, comprising
a first articulation element and a second articulation element which are each provided with an attachment for attachment to a support element and to the video-photographic equipment, respectively, and which can be mutually moved to orientate the video-photographic equipment, said first articulation element comprising a member which is internally hollow and which defines a receiving cavity for said second articulation element, a locking device which is mounted on said member and which can be actuated to thrust said second articulation element along a locking axis between a release configuration, wherein said second articulation element is free to slide in said receiving cavity, and a locking configuration, wherein said second articulation element is urged against an abutment surface of said member and is locked in a desired orientation position in said receiving cavity, wherein said locking device further comprises a first guide element and a second guide element which are positioned in said member and a pushing element which is interposed between said first guide element and said second guide element along said locking axis and which can be moved in translation with respect to those guide elements along an axis of translation which is transverse to said locking axis, said first guide element being operatively interposed between said pushing element and said second articulation element, wherein there is provided at least one rolling member which is interposed between said pushing element and said first guide element and/or said second guide element, and in that said pushing element is provided, on a base surface which is directed towards said first guide element or said second guide element, with at least one groove which cooperates with another groove defined in said first guide element or said second guide element to form a pair of guides for slidably receiving said at least one rolling member, wherein the base portion of at least one groove of said at least one pair of guides is inclined with respect to said locking axis in such a manner that, following said translation movement of said pushing element, there is generated a movement of said second articulation element along said locking axis, and in that a friction device is provided on said head, the friction device being arranged to friction the movement of said second articulation element in said receiving cavity, said friction device being able to be actuated independently of said locking device.

2. The support head according to claim 1, wherein said locking device further comprises an actuation handle which is positioned on said member and is actuatable so as to be rotated about said translation axis to actuate said locking device.

3. The support head according to claim 2, wherein said locking device further comprises a pair of pins which are fixedly joined to said actuation handle and which are operatively interposed between said actuation handle and said pushing element and which are intended to urge said pushing element along said translation axis.

4. The support head according to claim 3, wherein said pins are spaced apart from each other in the direction of a longitudinal axis which is perpendicular to said translation axis and said locking axis, and are positioned so as to abut said pushing element in two different longitudinally opposite peripheral portions thereof.

5. The support head according to claim 1, wherein said friction device comprises a handle which is positioned on said member and which can be actuated so as to be rotated about said translation axis to actuate said friction device.

6. The support head according to claim 5, wherein said friction device further comprises a screw which is fixedly joined to said handle which is intended to be moved in a corresponding nut screw following the rotation of said handle to be moved in the direction of said translation axis to abut said pushing element and to move it along the translation axis.

7. The support head according to claim 6, wherein said screw is interposed between said pins in the direction of said longitudinal axis.

8. The support head according to claim 7, wherein said base portion of said at least one groove is inclined through an angle between 5° and 30°.

9. The support head according to claim 1, wherein said base portion of both said grooves of each of said at least one pair of guides is inclined with respect to said locking axis.

10. The support head according to claim 9, wherein said base portion of the grooves of said same pair of guides is inclined with respect to said locking axis through the same angle.

11. The support head according to claim 1, wherein said pushing element is provided with at least one groove on both the base surfaces which are directed towards said first guide element and said second guide element, respectively.

12. The support head according to claim 11, wherein the base portions of the grooves defined in one of said base surfaces have inclinations which are in accordance with each other and counter to the inclination of the base portions of the grooves defined in the opposite base surface.

13. The support head according to claim 1, wherein said first guide element is provided with a thrust surface which is opposite said pushing element and which is intended to receive in abutment said second articulation element and which is formed so as to be connected with form-fitting to said second articulation element.

14. The support head according to claim 1, and further comprising an abutment element which is operatively interposed between said first guide element and said second articulation element and which is provided with an abutment surface which is intended to receive said second articulation element and which is formed so as to be connected with form-fitting to said second articulation element.

15. The support head according to claim 1, wherein said at least one groove extends along a longitudinal axis which is perpendicular to said translation axis and said locking axis.

16. The support head according to claim 1, wherein said at least one rolling member comprises at least one rolling cylinder or at least one ball.

17. The support head according to claim 1, and further comprising a control device for controlling the position of said second guide element along said locking axis.

* * * * *